(12) United States Patent
Yu et al.

(10) Patent No.: US 10,255,510 B2
(45) Date of Patent: Apr. 9, 2019

(54) DRIVING ASSISTANCE INFORMATION GENERATING METHOD AND DEVICE, AND DRIVING ASSISTANCE SYSTEM (71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Gang Yu, Beijing (CN); Chao Li, Beijing (CN); Qizheng He, Beijing (CN); Muge Chen, Beijing (CN); Yuxiang Peng, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 63 days.

(21) Appl. No.: 15/443,729

(22) Filed: Feb. 27, 2017

(65) Prior Publication Data

US 2018/0005054 A1   Jan. 4, 2018

(30) Foreign Application Priority Data

Jun. 30, 2016  (CN) .......................... 2016 1 0509712

(51) Int. Cl.
G06K 9/00    (2006.01)
H04N 7/18    (2006.01)
(Continued)

(52) U.S. Cl.
CPC ..... *G06K 9/00805* (2013.01); *G06K 9/00798* (2013.01); *G06K 9/46* (2013.01);
(Continued)

(58) Field of Classification Search
CPC combination set(s) only.
See application file for complete search history.

(56) References Cited

U.S. PATENT DOCUMENTS

8,886,387 B1 * 11/2014 Agarwal .............. G05D 1/0253
                                                            701/28
9,817,399 B2 * 11/2017 Braunstein ........... G05D 1/0088
(Continued)

*Primary Examiner* — Anand P Bhatnagar
(74) *Attorney, Agent, or Firm* — Hamre, Schumann, Mueller & Larson, P.C.

(57) ABSTRACT

Provided are a driving assistance information generating method and device, and a driving assistance system, which relate to a field of vehicle driving assistance technique. The driving assistance information generating method comprises: obtaining a depth image acquired by a depth camera and a scene image acquired by an imaging camera, the depth camera and the imaging camera being mounted on a vehicle in a manner of being registered and matched with each other, and a coverage of the depth camera and a coverage of the imaging camera being at least partially overlapped; detecting positions of respective objects appearing in the scene image by using the depth image and the scene image; and generating driving assistance information of the vehicle based on positions of the respective objects.

27 Claims, 4 Drawing Sheets (51) Int. Cl.
*G06T 7/73* (2017.01)
*G06K 9/46* (2006.01)
*G06T 7/13* (2017.01)
*G06T 7/246* (2017.01)
*G06N 3/08* (2006.01)
*H04N 13/25* (2018.01)
*G06K 9/62* (2006.01)
*H04N 13/254* (2018.01)

(52) U.S. Cl.
CPC ......... *G06K 9/4604* (2013.01); *G06K 9/4633* (2013.01); *G06K 9/6293* (2013.01); *G06N 3/08* (2013.01); *G06T 7/13* (2017.01); *G06T 7/248* (2017.01); *G06T 7/74* (2017.01); *H04N 7/181* (2013.01); *H04N 13/25* (2018.05); *G06T 2207/10004* (2013.01); *G06T 2207/10028* (2013.01); *G06T 2207/30256* (2013.01); *G06T 2207/30261* (2013.01); *H04N 13/254* (2018.05)

(56) References Cited

U.S. PATENT DOCUMENTS

| | | | |
|---|---|---|---|
| 9,905,015 B2* | 2/2018 | Dane | G06T 7/20 |
| 9,939,813 B2* | 4/2018 | Shashua | G05D 1/0088 |
| 9,977,430 B2* | 5/2018 | Shalev-Shwartz | G05D 1/0221 |
| 2004/0247157 A1* | 12/2004 | Lages | G01S 17/89 382/103 |
| 2010/0183192 A1* | 7/2010 | Fritsch | G06T 7/254 382/103 |
| 2013/0079990 A1* | 3/2013 | Fritsch | B62D 6/007 701/41 |
| 2013/0222127 A1* | 8/2013 | Ray Avalani | B60Q 9/008 340/436 |
| 2015/0371095 A1* | 12/2015 | Hartmann | G06K 9/00791 348/148 |
| 2016/0003636 A1* | 1/2016 | Ng-Thow-Hing | H04N 7/188 701/26 |
| 2017/0084038 A1* | 3/2017 | Dane | G06T 7/0051 |
| 2018/0012367 A1* | 1/2018 | Dane | G06K 9/00791 |

* cited by examiner

DRIVING ASSISTANCE INFORMATION GENERATING METHOD AND DEVICE, AND DRIVING ASSISTANCE SYSTEM

CROSS-REFERENCE TO RELATED APPLICATIONS

The present application claims the priority of a Chinese patent application No. 201610509712.5 filed on Jun. 30, 2016, the disclosure of which is incorporated herein by reference in its entirety.

TECHNICAL FIELD

The present disclosure relates to a field of vehicle driving assistance technique, and more particularly, to a driving assistance information generating method and device, and a driving assistance system.

BACKGROUND

A vehicle driving assistance system plays a very important role in traffic safety and high driving efficiency, and it is possible to avoid a collision that may be caused by a vehicle driver's driving mistakes to a large extent by using the vehicle driving assistance system.

Current vehicle driving assistance systems often rely on radar or a monocular camera, which has a lot of limitations per se. Radar can always detect a distance of an obstacle ahead of or behind a vehicle, but cannot specify a category of the obstacle, for example, radar cannot distinguish whether an obstacle is a vehicle or a roadblock, and cannot determine a current status of a lane, so usually radar is only used in some limited scenarios, such as reversing. The monocular camera can recognize an object ahead of or behind a vehicle, for example, it can distinguish a vehicle, a pedestrian, a lane and so on, but it cannot accurately estimate distance information of an object. Even if distance information is detected by using a binocular camera, since the monocular camera and the binocular camera both rely on passive visible light to implement detection, so it is difficult to use them at night or in low light conditions.

Thus, there is a need for a method and device for generating driving assistance information by using a depth camera based on active light.

SUMMARY

The present disclosure is provided in view of the above problems. In the present disclosure, there are provided a driving assistance information generating method and device, which can, by using a depth image acquired by a depth camera based on active light and a scene image acquired by an imaging camera based on passive light, recognize positions of respective objects appearing in the scene image and thereby generate driving assistance information for a vehicle.

According to an aspect of the present disclosure, there is provided a driving assistance information generating method, comprising: obtaining a depth image acquired by a depth camera and a scene image acquired by an imaging camera, the depth camera and the imaging camera being mounted on a vehicle in a manner of being registered and matched with each other, and a coverage of the depth camera and a coverage of the imaging camera being at least partially overlapped; detecting positions of respective objects appearing in the scene image by using the depth image and the scene image; and generating driving assistance information of the vehicle based on the positions of the respective objects.

According to another aspect of the present disclosure, there is provided a driving assistance information generating device, comprising: an image obtaining module for obtaining a depth image acquired by a depth camera and a scene image acquired by an imaging camera, the depth camera and the imaging camera being mounted on a vehicle in a manner of being registered and matched with each other, and a coverage of the depth camera and a coverage of the imaging camera being at least partially overlapped; an object detecting module for detecting positions of respective objects appearing in the scene image by using the depth image and the scene image; and a driving assistance information generating module for generating driving assistance information of the vehicle based on the positions of the respective objects.

According to yet another aspect of the present disclosure, there is provided a driving assistance system, comprising: a depth camera for acquiring a depth image within its coverage; an imaging camera for acquiring a scene image within its coverage, the depth camera and the imaging camera being mounted on a vehicle in a manner of being registered and matched with each other, and the coverage of the depth camera and the coverage of the imaging camera being at least partially overlapped; at least one processor; at least one memory for storing computer program codes which are configured to perform the following steps when being executed by the processor: detecting positions of respective objects appearing in the scene image by using the depth image and the scene image; and generating driving assistance information of the vehicle based on the positions of the respective objects.

According to still yet another aspect of the present disclosure, there is provided a computer program product for generating driving assistance information, comprising a computer-readable storage medium on which computer program instructions are stored, the computer program instructions being configured to cause a processor to perform the following steps when being executed by the processor: obtaining a depth image acquired by a depth camera and a scene image acquired by an imaging camera; detecting positions of respective objects appearing in the scene image by using the depth image and the scene image; and generating driving assistance information of the vehicle based on the positions of the respective objects.

The driving assistance information generating method, the driving assistance information generating device, the driving assistance information generating system, and the computer program product for generating driving assistance information according to embodiments of the present disclosure can better ensure accuracy of the generated driving assistance information in comparison to the prior art.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather

DETAILED DESCRIPTION OF THE EMBODIMENTS

To make the objectives, technical solutions, and advantages of the present disclosure be clearer, exemplary embodiments of the present disclosure will be described in detail with reference to the accompanying drawings. Obviously, the described embodiments merely are parts of the embodiments of the present disclosure, rather than all of the embodiments of the present disclosure, it should be understood that the present disclosure is not limited to the exemplary embodiments described herein. All other embodiments obtained by those skilled in the art without paying inventive efforts should fall into the protection scope of the present disclosure.

First, a block diagram of the driving assistance system according to an embodiment of the present disclosure will be described with reference to FIG. 1.

Figure 1:
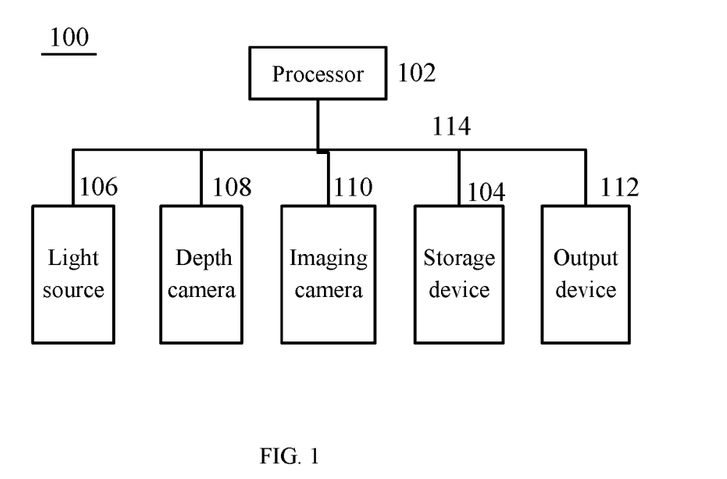
FIG. 1 is a schematic block diagram of the driving assistance system according to an embodiment of present disclosure.

As shown in FIG. 1, the driving assistance system 100 comprises one or more processors 102, a storage device 104, a light source 106, a depth camera 108, an imaging camera 110, and an output device 112. These components are interconnected through a bus system 114 and/or a connection mechanism in other forms (not shown). It should be noted that the components and structure of the driving assistance system 100 shown in FIG. 1 are merely exemplary, rather than restrictive, the driving assistance system 100 may also have other components and structure if needed.

The processor 102 may be a Central Processing Unit (CPU) or a processing unit in other forms having a data processing capability and/or an instruction execution capability.

The memory device 104 may include one or more computer program products, the computer program product(s) may include computer readable storage mediums in various forms, for example, a volatile memory and/or a non-volatile memory. The volatile memory may, for example, include a Random Access Memory (RAM) and/or a cache memory (cache), and so on. The non-volatile memory may, for example, include a Read Only Memory (ROM), a hard disk, a flash memory, and so on. There may be one or more computer program instructions stored on the computer readable storage mediums, which may be executed by the processor 102 so as to implement respective functions and/or other desired functions (implemented by a processor) in an embodiment of the present disclosure as described below.

The depth camera 108 may operate in cooperation with the light source 106, and acquire a depth image based on visible light emitted from the light source 106. The depth camera 108 and the light source 106 may together constitute a depth camera based on the principle of structure light, or may together constitute a TOF (time of flight) camera. The depth camera 108 generates a depth image. Hereinafter, the depth camera 108 and the light source 106 together are referred to as a depth camera based on active light.

The imaging camera 110 acquires a scene image, the scene image may be an RGB image or a black-and-white image. The depth camera 108 and the imaging camera 110 are registered and matched with each other, and a coverage of the depth camera 108 and a coverage of the imaging camera 110 are at least partially overlapped, so that depth color data including both depth data and color data can be generated from the depth image and the scene image.

The light source 106, the depth camera 108, and the imaging camera 110 may be amounted together at the front of a vehicle, or at the rear of a vehicle. Alternatively, the light source 106, the depth camera 108, and the imaging camera 110 may be amounted together at a side of a vehicle.

Figure 2:
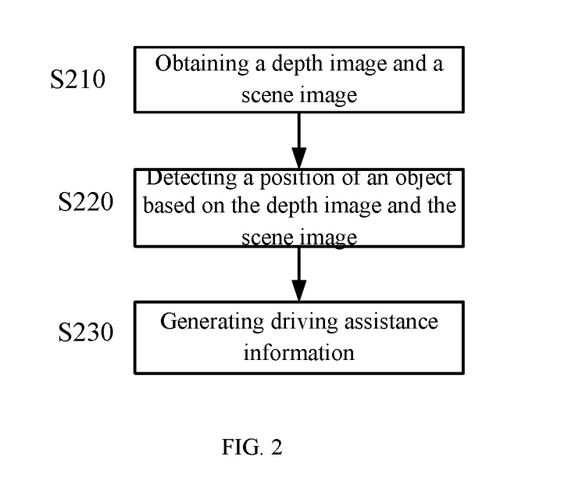
FIG. 2 is a schematic flowchart of the driving assistance information generating method according to an embodiment of the present disclosure.

FIG. 2 is a schematic flowchart of the driving assistance information generating method 200 according to an embodiment of the present disclosure.

In step S210, a depth image acquired by a depth camera and a scene image acquired by an imaging camera are obtained. According to an embodiment of the present disclosure, the depth camera and the imaging camera are mounted on a vehicle in a manner of being registered and matched with each other, for example, they may be mounted at the front of a vehicle or at the rear of a vehicle, and a coverage of the depth camera and a coverage of the imaging camera are at least partially overlapped.

According to an embodiment of the present disclosure, the depth camera is a depth camera based on active light, and may, for example, be a depth camera based on the principle of structure light, or a TOF (time of flight) camera.

In step S220, positions of respective objects appearing in the scene image are detected by using the depth image and the scene image.

In step S230, driving assistance information of the vehicle is generated based on the positions of the respective objects.

According to an embodiment of the present disclosure, by means of registering and matching the depth camera and the scene camera with each other, respective objects within the coverage of the depth camera and the scene camera can be detected and positions of the respective objects can be detected, by using the depth image acquired by the depth camera and the scene image acquired by the scene camera. In addition, according to an embodiment of the present disclosure, by means of using depth information acquired by the depth camera based on active light and scene image information acquired by the scene camera, positions of respective objects within the coverage can be detected even at night or in low light conditions, thereby driving assistance information of the vehicle can be generated.

Figure 3A:
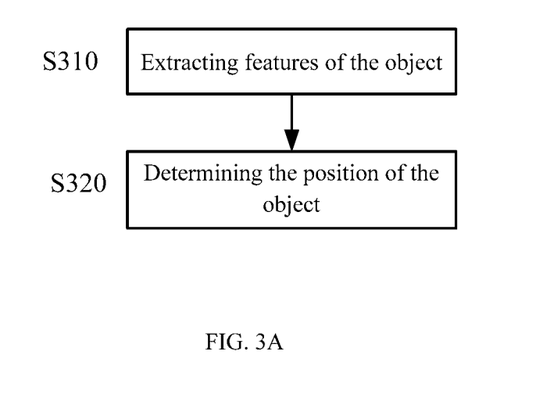
FIG. 3A is a schematic flowchart of generating position information of respective objects from the depth image and the scene image according to an embodiment of the present disclosure.

FIG. 3A is a schematic flowchart of generating position information of respective objects from the depth image and the scene image according to an embodiment of the present disclosure.

The scene image may be a color image or a black-and-white image, next, description is provided with the scene image being an RGB color image as an example. It should be appreciated that, an embodiment of the present disclosure is not limited to a scene image which is an RGB color image.

In a case where the scene image is an RGB image, depth color image data of four channels (RGBD) can be generated by using the depth image and the scene image.

In step S310, features of respective objects appearing in the scene image are extracted based on the depth color image data of four channels, the object may be an obstacle, other vehicle, a roadbed, a fence, a green belt and so on.

Thereafter, at step S320, positions of the respective objects are determined based on the extracted features of the respective objects appearing in the scene image. Optionally, unique identifiers for the respective objects may be also generated. Object tracking may be performed in a plurality of frames of scene images acquired continuously based on the unique identifiers of the respective objects. Optionally, after the positions of the respective objects are detected, confidence information may be also generated, and the confidence information may indicate confidence of position detection. Optionally, the unique identifiers and/or the confidence information may serve as a basis for generating the driving assistance information of the vehicle, so as to further ensure reliability of assistance driving.

As an example, as for each detected object appearing in the scene image, a unique identifier of the object and a position of the object may be detected based on the extracted features of the object appearing in the scene image, and position of the object detected according to at least one frame of depth image acquired previously and at least one frame of scene image acquired previously.

For example, a position of each object may be defined with (x, y, w, h), where x represents a start horizontal coordinate of the object, y represents a start vertical coordinate of the object, w represents a traverse width of the object, and h represents a vertical height of the object.

According to an embodiment of the present disclosure, after the positions of respective objects in the scene image are determined, distances between the respective objects and the current vehicle may be further determined based on depth data of the depth image.

For example, it may be assumed that in a current frame of scene image, there are N points on a certain object, for each of the N points, a distance between the point and the current vehicle may be obtained based on the depth image, thereafter the distances obtained for the N points are averaged, this resulting average value is regarded as a distance between the object and the current vehicle. In addition, a running speed of the vehicle relative to the object may be further determined based on the distance between the object and the current vehicle determined according to the current frame of depth image, a distance between the object and the current vehicle determined according to a previous frame of depth image, and a frame rate of the depth camera.

Optionally, the distance and the running speed of the current vehicle relative to the object as calculated currently may be smoothed by using distances and running speeds of the current vehicle relative to the object as calculated previously, so as to reduce noise.

Figure 3B:
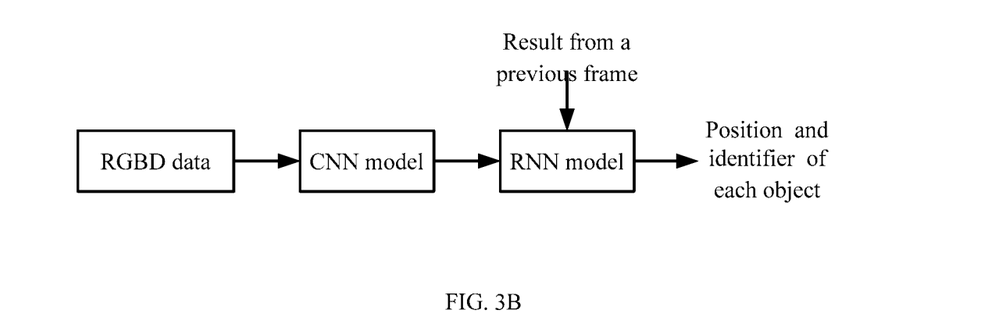
FIG. 3B is a schematic block diagram of a specific implementation of generating position information of respective objects from the depth image and the scene image according to an embodiment of the present disclosure.

In an embodiment of the present disclosure, position information of respective objects may be generated from the depth image and the scene image based on various possible methods (such as the successive image difference method). FIG. 3B is a schematic block diagram of a specific implementation of generating position information of respective objects from the depth image and the scene image according to an embodiment of the present disclosure.

As an example, features of an object appearing in the scene image may be extracted by using a CNN (Convolutional Neural Network) model and based on depth color image data of four channels.

Regarding the CNN (Convolutional Neural Network) model, reference may be made to the article "*Very Deep Convolutional Networks for Large-Scale Image Recognition*" by Karen Simonyan et al and the article "*Deep Residual Learning for Image Recognition*" by Kaiming He et al, no more details repeated here.

As an example, as for each detected object appearing in the scene image, a unique identifier of the object may be generated and a position of the object may be detected by using an RNN (Recurrent Neural Network) model and based on the extracted features of the object appearing in the scene image, and a position of the object detected according to at least one frame of depth image acquired previously and at least one frame of scene image acquired previously.

Regarding the RNN (Recurrent Neural Network) model, reference may be made to the article "*A Critical Review of Recurrent Neural Networks for Sequence Learning*" by Zachary C. Lipton et al and the article "Empirical Evaluation of Gated Recurrent Neural Networks on Sequence Modeling" by Junyoung Chung et al, no more details repeated here.

The method of extracting features by using the CNN (Convolutional Neural Network) model and generating the unique identifier of the object and detecting the position of the object by using the RNN (Recurrent Neural Network) model in this example can better ensure accuracy of a detection result in comparison to other methods.

Figure 4A:
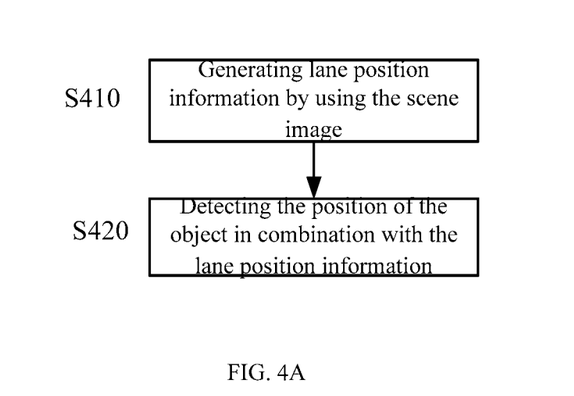
FIG. 4A is a schematic flowchart of generating position information of respective objects from the depth image and the scene image according to an embodiment of the present disclosure.

FIG. 4A is a schematic flowchart of generating position information of respective objects from the depth image and the scene image according to an embodiment of the present disclosure.

In step S410, lane position information is generated by using the scene image.

Thereafter, in step S420, positions of respective objects appearing in the scene image are detected by using the depth image and the scene image and in combination with the lane position information.

Specifically, in step S420, features of an object appearing in the scene image may be extracted based on the depth color image data of four channels, the object may be an obstacle, other vehicle, a roadbed, a fence, a green belt and so on. Thereafter, as for each detected object appearing in the scene image, a unique identifier of the object and a position of the object can be detected based on the lane position information, the extracted features of the object appearing in the scene image, and position of the object detected according to at least one frame of depth image acquired previously and at least one frame of scene image acquired previously. Object tracking may be performed in a plurality of frames of scene images acquired continuously based on the unique identifiers of the respective objects. Optionally, after positions of the respective objects are detected, confidence information may be also generated, and the confidence information may indicate confidence of position detection.

As an example, as for each detected object appearing in the scene image, a unique identifier of the object may be generated and a position of the object may be detected by using an RNN (Recurrent Neural Network) model, based on the extracted features of the object appearing in the scene image, and a position of the object detected according to at least one frame of depth image acquired previously and at least one frame of scene image acquired previously.

Figure 4B:
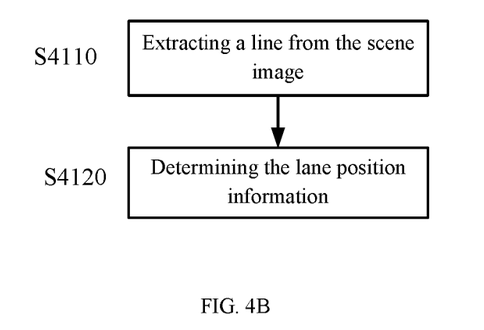
FIG. 4B is a schematic flowchart of generating lane position information by using the scene image according to an embodiment of the present disclosure.

In an embodiment of the present disclosure, the lane position information of respective objects may be generated from the depth image and the scene image based on various possible methods (such as the successive image difference method). FIG. 4B is a schematic flowchart of generating lane position information by using the scene image according to an embodiment of the present disclosure.

In step S4110, a line is extracted from the scene image, the line may be a straight line or a curve.

The lane may be mainly divided into a straight line lane and a curve lane at a corner. There may be a white line, a yellow line, an intermediate green belt, an intermediate fence, a roadside embankment and so on in a road, for example, lanes of the same heading/driving direction may be divided by the white line or the yellow line, lanes of different heading/driving directions may be divided by the intermediate green belt or the intermediate fence, and a range of the lanes may be defined by the roadside embankment.

As an example, an edge detection method may be adopted to detect, from a currently acquired one frame of scene image, a position of an edge in the current frame of scene image, and thereby an edge map corresponding to this frame of scene image may be generated. Thereafter, straight line information or curve information in this frame of scene image may be obtained based on the edge map corresponding to this frame of scene image.

For example, the CNN (Convolutional Neural Network) model may be used to detect, from a currently acquired one frame of scene image, a position of an edge in the current frame of scene image based on the edge detection method, and an edge map corresponding to this frame of scene image may be generated.

Regarding the edge detection method, reference may be made to the article *"Holistically-Nested Edge Detection"* by Saining Xie et al and the article *"Pushing the Boundaries of Boundary Detection Using Deep Learning"* by Lasonas Kokkinos et al, no more details repeated here.

For example, as for the edge map corresponding to this frame of scene image, a Hough voting method may be used to obtain straight line information and curve information of this frame of scene image.

The method of generating the lane position information by using the scene image in this example can better ensure accuracy of the lane position information in comparison to other methods.

In step S4120, the lane position information is generated based on the extracted line.

Figure 4C:
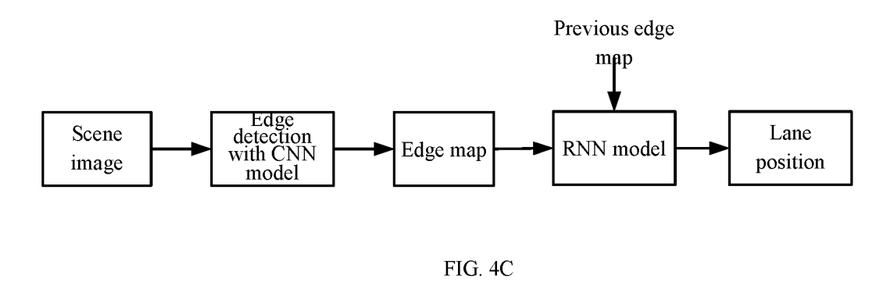
FIG. 4C is a schematic block diagram of a specific implementation of generating lane position information by using the scene image according to an embodiment of the present disclosure.

FIG. 4C is a schematic block diagram of a specific implementation of generating lane position information by using the scene image according to an embodiment of the present disclosure.

As an example, the lane position information is determined based on a line extracted in this frame of scene image, and a line extracted from at least one frame of scene image acquired previously.

For example, the lane position information may be obtained by using a RNN (Recurrent Neural network) model, and based on a line extracted in this frame of scene image, and a line extracted from at least one frame of scene image acquired previously.

According to an embodiment of the present disclosure, an edge map corresponding to one frame of scene image may be not complete, an incomplete edge map can be repaired into a complete edge map by using the RNN (Recurrent Neural network) model. Further, parameters of a lane position prediction equation may be rectified according to the repaired complete edge map and the lane position determined in the current frame of scene image. On the other hand, a lane position in a next frame may be predicted according to the repaired complete edge map and by using the rectified lane position prediction equation.

According to an embodiment of the present invention, parameters of a convolutional neural network (CNN) model for lane detection and parameters of a convolutional neural network (CNN) model for object detection are different, and parameters of a Recurrent network model (RNN) for lane detection and parameters of a Recurrent network (RNN) model for object detection are different.

According to an embodiment of the present disclosure, an object appearing in the scene image may include an obstacle, other vehicle, a roadbed, a fence, a green belt and so on.

According to an embodiment of the present disclosure, after the lane position information is determined, lanes where respective objects reside in the scene image can be determined.

In a case where the object is an obstacle, it may be assumed that in a current frame of scene image, there are N points on the obstacle, depths of the N points (distances of the N points relative to the current vehicle) may be obtained based on the depth image, thereafter the distances of the N points relative to the current vehicle are averaged, this resulting average value is regarded as the distance between the obstacle and the current vehicle. When the distance between the obstacle and the current vehicle is less than a predetermined distance threshold, driving assistance information for prompting a driver that the distance between the obstacle and the current vehicle is too small is generated. Additionally or alternatively, in a case where the object is an obstacle, a running speed of the current vehicle relative to the obstacle may be determined, a time at which the current vehicle is to collide with the obstacle may be determined according to the distance between the current vehicle and the obstacle and the running speed of the current vehicle relative to the obstacle, and when the determined time is less than a predetermined time threshold, driving assistance information for prompting a driver that the vehicle has a risk of colliding with the obstacle is generated.

In a case where the object in the scene image is other vehicle, it may be assumed that in a current frame of scene image in, there are N points on said other vehicle, depths of the N points (distances of the N points relative to the current vehicle) may be obtained based on the depth image, thereafter the distances of the N points relative to the current vehicle are averaged, this resulting average value is regarded as the distance between said other vehicle and the current vehicle.

In addition, as described above, every other vehicle can be tracked according to a unique identifier of said other vehicle.

Specifically, as for every other vehicle, a relative running speed of said other vehicle relative to the current vehicle is determined based on a distance between said other vehicle and the current vehicle in the current frame of scene image, a distance between said other vehicle and the current vehicle in a previous frame of scene image, and a frame rate of the scene camera.

In a case where the object is other vehicle, when the distance between said other vehicle and the current vehicle is less than a predetermined distance threshold, driving assistance information for prompting a driver that the distance between said other vehicle and the current vehicle is too small may be generated. Additionally or alternatively, in a case where the object is other vehicle, a running speed of the current vehicle relative to said other vehicle may be determined, a time at which the current vehicle is to collide with said other vehicle may be determined according to the distance between the current vehicle and said other vehicle and the running speed of the current vehicle relative to said other vehicle (i.e., time that elapses until the current vehicle and said other vehicle collide if running states of the current vehicle and said other vehicle do not change), and when the determined time is less than a predetermined time threshold, driving assistance information for prompting a driver that the current vehicle has a risk of colliding with said other vehicle is generated.

Figure 5:
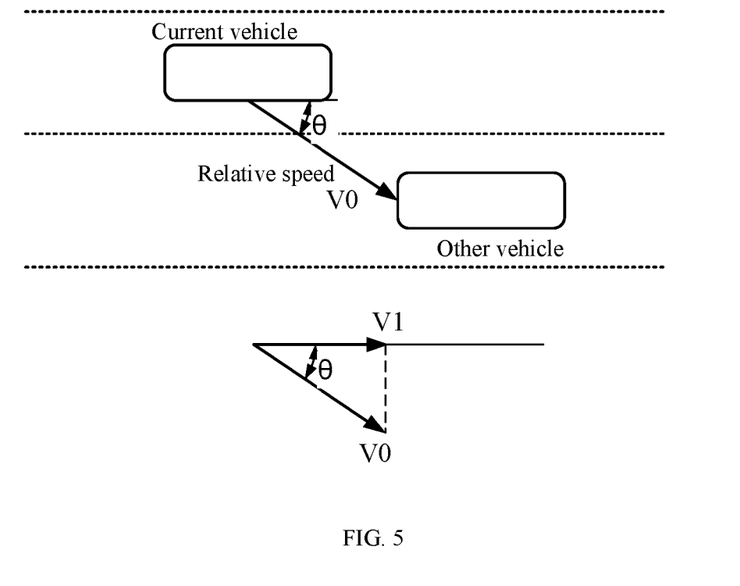
FIG. 5 is a schematic diagram of calculating the vehicle running speed.

In addition, the relative running speed of said other vehicle relative to the current vehicle may include two components: a longitudinal component along a lane direction, and a lateral component along a direction perpendicular to the lane direction. The relative running speed V1 of said other vehicle along a lane where it resides may be determined according to the lane position information, a position of said other vehicle in the current frame of scene image, and a relative running speed V0 of said other vehicle with respect to the current vehicle, V1=V0*cos θ, where θ is an angle between the lane direction and a connection line between the current vehicle and said other vehicle. Thereafter, in combination with the running speed Vc of the current vehicle, an absolute running speed Vs of said other vehicle along the lane where it resides is determined, Vs=V1+Vc. As shown in FIG. 5, calculating of the running speed of said other vehicle is shown.

In particular, in a case where said other vehicle is a vehicle ahead of the current vehicle, driving assistance information for prompting a driver that the distance between the current vehicle and the vehicle ahead is too small may be generated, or driving assistance information for prompting a driver that the current vehicle has a risk of colliding with the vehicle ahead may be generated; in a case where said other vehicle is a vehicle behind the current vehicle, driving assistance information for prompting a driver that the distance between the current vehicle and the vehicle behind may be generated, or driving assistance information for prompting a driver that the current vehicle has a risk of colliding with the vehicle behind may be generated.

A vehicle ahead of the current vehicle may be a vehicle straight ahead of the current vehicle (e.g., a vehicle in the same lane with respect to the current vehicle), or may be a vehicle sideward ahead of the current vehicle (e.g., a vehicle in a different lane with respect to the current vehicle). A vehicle behind the current vehicle may be a vehicle straight behind the current vehicle (e.g., a vehicle in the same lane with respect to the current vehicle), or may be a vehicle sideward behind the current vehicle (e.g., a vehicle in a different lane with respect to the current vehicle).

In a case where the vehicle ahead of the current vehicle is a vehicle sideward ahead of (or sideward behind) the current vehicle, the distance between the current vehicle and the vehicle sideward ahead may include two components: a longitudinal distance along a lane direction, and a lateral distance along a direction perpendicular to the lane direction. In a case where the lateral distance is less than a predetermined lateral distance threshold, driving assistance information for prompting a driver that the vehicle has a risk of colliding with the vehicle sideward ahead (or sideward behind) may be generated. Additionally or alternatively, in a case where the current vehicle has a lateral speed with respect to the vehicle sideward ahead (or sideward behind), a time at which the current vehicle is to collide with the vehicle sideward ahead or sideward behind may be determined based on the lateral distance and the lateral speed, when the determined time is less than a predetermined time threshold, driving assistance information for prompting a driver that the vehicle has a risk of sideward colliding with the vehicle sideward ahead (or sideward behind) may be generated.

In an embodiment of the present disclosure, a lane where a current vehicle resides can be determined based on the lane position information, for example, the current vehicle occupies one lane or occupies two lanes. In a case where the current vehicle occupies one lane, a position of the current vehicle in the lane is further determined, for example, the current vehicle resides in a center of the current lane, or the current vehicle deviates from a center of the current lane and resides at one side in the lane. When the current vehicle deviates from the center of the current lane and resides at one side in the lane, driving assistance information for prompting a driver that the vehicle deviates from the center of the lane may be generated.

In addition, according to an embodiment of the present disclosure, when the current vehicle occupies one lane, a speed limit in this lane may be obtained, the speed limit may include at least one of a speed upper limit and a speed lower limit. When the running speed of the current vehicle exceeds the speed upper limit in the lane, driving assistance information for prompting a driver that the current vehicle is overspeed may be generated; when the running speed of the current vehicle is less than the speed lower limit in the lane, driving assistance information for prompting a driver that the current vehicle is underspeed may be generated.

Still further, according to an embodiment of the present disclosure, whether the current vehicle is driving forward or driving reversely can be determined according to at least parts of the lane position information, the running speed of the current vehicle with respect to other vehicle, and the running speed of the current vehicle.

The driving assistance information generating method according to an embodiment of the present disclosure is more advantageous to ensure accuracy of the generated driving assistance information in comparison to the conventional methods based on radar or monocular camera.

The driving assistance information generating device 600 according to an embodiment of the present disclosure will be described below with reference to FIG. 6.

Figure 6:
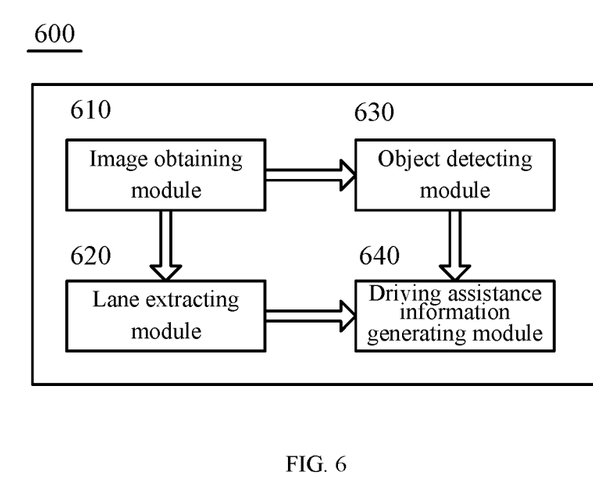
FIG. 6 is a schematic block diagram of the driving assistance information generating device according to an embodiment of the present disclosure.

As shown in FIG. 6, the driving assistance information generating device 600 comprises an image obtaining module 610, a lane extracting module 620, an object detecting module 630, and a driving assistance information generating module 640.

The image obtaining module 610 is for obtaining a depth image acquired by a depth camera and a scene image acquired by an imaging camera, wherein the depth camera and the imaging camera are mounted on a vehicle in a manner of being registered and matched with each other, and a coverage of the depth camera and a coverage of the imaging camera are at least partially overlapped.

The object detecting module 630 is for detecting positions of respective objects appearing in the scene image by using the depth image and the scene image. The object detecting module 630 is for executing operations in steps S220, as well as S310 and S320.

The driving assistance information generating module 640 is for generating driving assistance information of the vehicle based on the positions of the respective objects.

The object detecting module 630 may further comprise a feature extracting module 6310 and a position determining module 6320. The feature extracting module 6310 is for extracting features of respective objects appearing in the scene image based on the depth image and the scene image. The position determining module 6320 is for determining the positions of the respective objects based on the extracted features of the respective objects appearing in the scene image. In addition, the object detecting module 630 further, as for each object appearing in the scene image, generates a unique identifier for the object. In this case, the driving assistance information generating module 640 generates the driving assistance information of the vehicle based on the positions of the respective objects and their unique identifiers. Optionally, the object detecting module 630 further generates confidence information for object detection.

In a specific example, the feature extracting module 6310 is for extracting features of respective objects appearing in the scene image by using a Convolutional Neural Network (CNN) model and based on the depth image and the scene image. The position determining module 6320 is for detecting positions of respective objects appearing in the scene image and generating a unique identifier for each of the respective objects by using a Recurrent Neural Network (RNN) and based on the extracted features of the respective objects appearing in the scene image, the lane position information, and positions of the respective objects detected according to at least one frame of depth image acquired previously and at least one frame of scene image acquired previously.

The lane extracting module 620 is for generating lane position information by using the scene image. The lane extracting module 620 is for executing operations in steps S410 as well as S4110 and S4120.

In addition, in a case where the lane extracting module 620 generates the lane position information, the object detecting module 6320 detects positions of respective objects appearing in the scene image by using the depth image and the scene image and in combination with the lane position information. In this case, the object detecting module 6320 executes operations in step S420.

The lane extracting module 620 may comprise a line extracting module 6210 and a lane generating module 6220. The line extracting module 6210 is for extracting a line from the scene image, the line including at least one of a straight line and a curve. The lane generating module 6220 is for generating the lane position information based on the extracted line. In a specific example, the line extracting module 6120 is for predicting a position of an edge in a current frame of scene image by using a convolutional neural network (CNN) model and based on each frame of scene image, so as to generate an edge map corresponding to the current frame of scene image, and extracting a line from the edge map by using a Hough voting algorithm, wherein the line includes at least one of a straight line and a curve; and the lane generating module 6220 is for obtaining the lane position information based on the extracted line and by using a Recurrent neural network (RNN) model to integrate information on a time axis.

Figure 7:
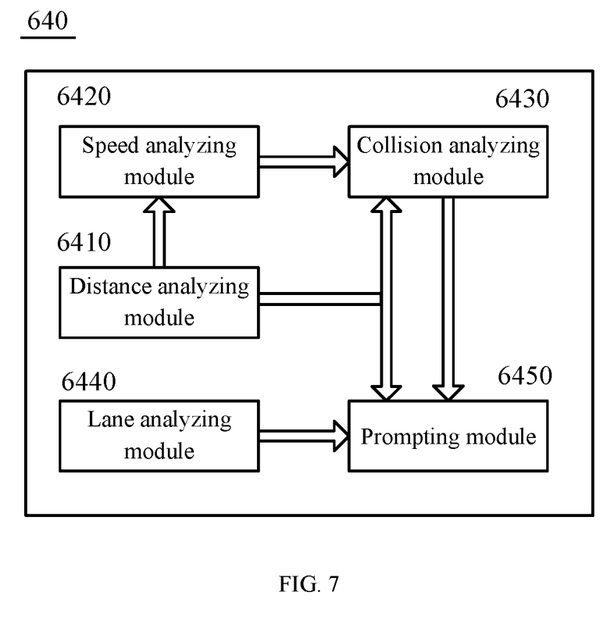
FIG. 7 is a schematic block diagram of the driving assistance information generating module according to an embodiment of the present disclosure.

FIG. 7 is a schematic block diagram of the driving assistance information generating module 640 according to an embodiment of the present disclosure.

In an embodiment of the present disclosure, the driving assistance information generating module 640 may comprise a distance analyzing module 6410, a speed analyzing module 6420, a collision analyzing module 6430, a lane analyzing module 6440, and a prompting module 6450.

The distance analyzing module 6410 is for, as for each object appearing in the scene image, determining a distance between the object and the vehicle.

The speed analyzing module 6420 is for determining a running speed of the vehicle relative to the object. As an example, the speed analyzing module 6420 may obtain a previous position of the object determined according to a previous depth image of the depth image and a previous scene image of the scene image based on the unique identifier of the object, and determine the running speed of the vehicle relative to the object based on a frame rate of the depth camera, the position of the object, and the previous position of the object.

The collision analyzing module 6430 is for determining a time at which the vehicle is to collide with the object. Specifically, the collision analyzing module 6430 determines a time at which the vehicle is to collide with the object based on the running speed of the vehicle relative to the object and the distance between the vehicle and the object.

The lane analyzing module 6440 is for determining a lane occupied by the vehicle according to the lane position information, and in a case where the vehicle occupies only one lane, determining a position of the vehicle in the lane.

The prompting module 6450 is for, in a case where the distance between the object and the vehicle is less than a predetermined distance threshold, generating driving assistance information for prompting a driver that the distance between the object and the vehicle is too small; in a case where the determined time is less than a predetermined time threshold, generating driving assistance information for prompting a driver that the vehicle has a risk of colliding with the object; in a case where the vehicle occupies more than one lane or the vehicle deviates from a center of the lane being occupied, generating driving assistance information for prompting a driver that the vehicle deviates from the center of the lane.

When the computer program codes stored in a storage device (e.g., memory) of the driving assistance system shown in FIG. 1 according to an embodiment of the present disclosure are executed by a processor, the driving assistance information generating method as described above is implemented and the driving assistance information generating device as described above is effectuated.

In addition, according to an embodiment of the present disclosure, there is further provided a computer program product for generating driving assistance information, comprising a computer-readable storage medium on which computer program instructions are stored, the computer program instructions being executable by the processor to cause the processor to implement the driving assistance information generating method and effectuate the driving assistance information generating device as described above.

According to an embodiment of the present disclosure, the depth image acquired by the depth camera and the scene image acquired by the imaging camera are used Recurrently to recognize respective objects appearing in the scene image and determine their positions, and further, driving assistance information of the current vehicle is generated according to distances of the respective objects and the current vehicle, and running speed of the respective objects relative to the current vehicle.

The driving assistance information generating method, the driving assistance information generating device, the driving assistance system, and the computer program product for generating driving assistance information in the embodiments of the present disclosure can better ensure accuracy of the generated driving assistance information with respect to the prior art.

Although the exemplary embodiments of the present disclosure have been described with reference to the drawings, as will be appreciated, the above exemplary embodiments are only illustrative, not intended to limit the protection scope of the present disclosure. Those of ordinary skill in the art may make many changes, modifications, thereto without departing from the principle and spirit of the present disclosure, and such changes, modifications should fall into the protection scope of the present disclosure.

What is claimed is:

1. A driving assistance information generating method, comprising:
   obtaining a depth image acquired by a depth camera and a scene image acquired by an imaging camera, the depth camera and the imaging camera being mounted on a vehicle in a manner of being registered and matched with each other, and a coverage of the depth camera and a coverage of the imaging camera being at least partially overlapped;
   detecting positions of respective objects appearing in the scene image by using the depth image and the scene image; and
   generating driving assistance information of the vehicle based on the positions of the respective objects,
   wherein said detecting positions of respective objects appearing in the scene image by using the depth image and the scene image comprises:
   generating lane position information by using the scene image; and
   detecting the positions of the respective objects appearing in the scene image by using the depth image and the scene image and in combination with the lane position information,
   wherein said generating lane position information by using the scene image comprises:
   extracting a line from the scene image, the line including at least one of a straight line and a curve; and
   generating the lane position information based on the extracted line.

2. The driving assistance information generating method according to claim 1, wherein said detecting positions of respective objects appearing in the scene image by using the depth image and the scene image comprises:
   extracting features of the respective objects appearing in the scene image based on the depth image and the scene image; and
   determining the positions of the respective objects based on the extracted features of the respective objects appearing in the scene image.

3. The driving assistance information generating method according to claim 1,
   when detecting the positions of the respective objects appearing in the scene image, as for each object appearing in the scene image, further comprising: generating a unique identifier for the object;
   wherein said generating driving assistance information of the vehicle based on the positions of the respective objects comprises: generating the driving assistance information of the vehicle based on the positions and the unique identifiers of the respective objects.

4. The driving assistance information generating method according to claim 3, further comprising: as for each object appearing in the scene image,
   determining a distance between the object and the vehicle; and
   in a case where the distance between the object and the vehicle is less than a predetermined distance threshold, generating driving assistance information for prompting a driver that the distance between the object and the vehicle is too small.

5. The driving assistance information generating method according to claim 3, further comprising: as for each object appearing in the scene image,
   determining a distance between the object and the vehicle;
   determining a running speed of the vehicle relative to the object;
   determining a time at which the vehicle is to collide with the object; and
   in a case where the determined time is less than a predetermined time threshold, generating driving assistance information for prompting a driver that the vehicle has a risk of colliding with the object.

6. The driving assistance information generating method according to claim 5, wherein said determining a running speed of the vehicle relative to the object comprises:
   obtaining a previous position of the object determined according to a previous depth image of the depth image and a previous scene image of the scene image, based on the unique identifier of the object; and
   determining the running speed of the vehicle relative to the object based on a frame rate of the depth camera, the position of the object, and the previous position of the object.

7. The driving assistance information generating method according to claim 1, wherein said detecting positions of respective objects appearing in the scene image by using the depth image and the scene image comprises:
   extracting features of the respective objects appearing in the scene image by using a convolutional neural network model and based on the depth image and the scene image; and
   detecting the positions of the respective objects appearing in the scene image and generating a unique identifier for each of the respective objects by using a Recurrent neural network model and based on the extracted features of the respective objects appearing in the scene image, the lane position information, and positions of the respective objects detected according to at least one frame of depth image acquired previously and at least one frame of scene image acquired previously.

8. The driving assistance information generating method according to claim 1, wherein said generating lane position information by using the scene image comprises:
   predicting a position of an edge in a current frame of scene image by using a convolutional neural network model and based on each frame of scene image, so as to generate an edge map corresponding to the current frame of scene image;

extracting a line from the edge map by using a Hough voting algorithm, wherein the line includes at least one of a straight line and a curve; and obtaining the lane position information based on the extracted line by using a feedback neural network model to integrate information on a time axis.

9. The driving assistance information generating method according to claim 1, further comprising:

determining a lane occupied by the vehicle according to the lane position information;

in a case where the vehicle occupies only one lane, determining a position of the vehicle in the lane; and in a case where the vehicle occupies more than one lane or the vehicle deviates from a center of the lane being occupied, generating driving assistance information for prompting a driver that the vehicle deviates from the center of the lane.

10. A driving assistance information generating device, comprising:

an image obtaining module for obtaining a depth image acquired by a depth camera and a scene image acquired by an imaging camera, the depth camera and the imaging camera being mounted on a vehicle in a manner of being registered and matched with each other, and a coverage of the depth camera and a coverage of the imaging camera being at least partially overlapped;

an object detecting module for detecting positions of respective objects appearing in the scene image by using the depth image and the scene image;

a driving assistance information generating module for generating driving assistance information of the vehicle based on the positions of the respective objects; and a lane extracting module for generating lane position information by using the scene image, wherein the object detecting module detects the positions of the respective objects appearing in the scene image by using the depth image and the scene image in combination with the lane position information, wherein the lane extracting module comprises:

a line extracting module for extracting a line from the scene image, the line including at least one of a straight line and a curve; and a lane generating module for generating the lane position information based on the extracted line.

11. The driving assistance information generating device according to claim 10, wherein the object detecting module comprises:

a feature extracting module for extracting features of the respective objects appearing in the scene image based on the depth image and the scene image; and a position determining module for determining the positions of the respective objects based on the extracted features of the respective objects appearing in the scene image.

12. The driving assistance information generating device according to claim 10, wherein as for each object appearing in the scene image, the object detecting module further generates a unique identifier for the object; and the driving assistance information generating module generates the driving assistance information of the vehicle based on the positions of the respective objects and their unique identifiers.

13. The driving assistance information generating device according to claim 12, wherein the driving assistance information generating module comprises:

a distance analyzing module for, as for each object appearing in the scene image, determining a distance between the object and the vehicle; and a prompting module for, in a case where the distance between the object and the vehicle is less than a predetermined distance threshold, generating driving assistance information for prompting a driver that the distance between the object and the vehicle is too small.

14. The driving assistance information generating device according to claim 12, wherein the driving assistance information generating module comprises:

a distance analyzing module for, as for each object appearing in the scene image, determining a distance between the object and the vehicle;

a speed analyzing module for determining a running speed of the vehicle relative to the object;

a collision analyzing module for determining a time at which the vehicle is to collide with the object; and a prompting module for, in a case where the determined time is less than a predetermined time threshold, generating driving assistance information for prompting a driver that the vehicle has a risk of colliding with the object.

15. The driving assistance information generating device according to claim 14, wherein the speed analyzing module obtains a previous position of the object determined according to a previous depth image of the depth image and a previous scene image of the scene image based on the unique identifier of the object, and determines the running speed of the vehicle relative to the object based on a frame rate of the depth camera, the position of the object, and the previous position of the object.

16. The driving assistance information generating device according to claim 10, wherein the object detecting module comprises:

a feature extracting module for extracting features of the respective objects appearing in the scene image by using a convolutional neural network model and based on the depth image and the scene image; and a position determining module for detecting the positions of the respective objects appearing in the scene image and generating a unique identifier for each of the respective objects by using a Recurrent neural network model and based on the extracted features of the respective objects appearing in the scene image, the lane position information, and positions of the respective objects detected according to at least one frame of depth image acquired previously and at least one frame of scene image acquired previously.

17. The driving assistance information generating device according to claim 10, wherein the lane extracting module comprises:

a line extracting module for predicting a position of an edge in a current frame of scene image by using a convolutional neural network model and based on each frame of scene image, so as to generate an edge map corresponding to the current frame of scene image, and extracting a line from the edge map by using a Hough voting algorithm, wherein the line includes at least one of a straight line and a curve; and a lane generating module for obtaining the lane position information based on the extracted line by using a Recurrent neural network model to integrate information on a time axis.

18. The driving assistance information generating device according to claim 10, wherein the driving assistance information generating module comprises:

a lane analyzing module for determining a lane occupied by the vehicle according to the lane position information, and in a case where the vehicle occupies only one lane, determining a position of the vehicle in the lane; and a prompting module for, in a case where the vehicle occupies more than one lane or the vehicle deviates from a center of the lane being occupied, generating driving assistance information for prompting a driver that the vehicle deviates from the center of the lane.

19. A driving assistance system, comprising:

a depth camera for acquiring a depth image within its coverage;

an imaging camera for acquiring a scene image within its coverage, the depth camera and the imaging camera being mounted on a vehicle in a manner of being registered and matched with each other, and the coverage of the depth camera and the coverage of the imaging camera being at least partially overlapped;

at least one processor;

at least one memory for storing computer program codes which are configured to perform the following steps when being executed by the processor:

detecting positions of respective objects appearing in the scene image by using the depth image and the scene image; and generating driving assistance information of the vehicle based on the positions of the respective objects, wherein said detecting positions of respective objects appearing in the scene image by using the depth image and the scene image comprises:

generating lane position information by using the scene image; and detecting the positions of the respective objects appearing in the scene image by using the depth image and the scene image in combination with the lane position information, wherein said generating lane position information by using the scene image comprises:

predicting a position of an edge in a current frame of scene image by using a convolutional neural network model and based on each frame of scene image, so as to generate an edge map corresponding to the current frame of scene image;

extracting a line from the edge map by using a Hough voting algorithm, wherein the line includes at least one of a straight line and a curve; and obtaining the lane position information based on the extracted line by using a Recurrent neural network model to integrate information on a time axis.

20. The driving assistance system according to claim 19, wherein said detecting positions of respective objects appearing in the scene image by using the depth image and the scene image comprises:

extracting features of the respective objects appearing in the scene image based on the depth image and the scene image; and determining the positions of the respective objects based on the extracted features of the respective objects appearing in the scene image.

21. The driving assistance system according to claim 19, wherein the computer program codes are further configured to perform the following step when being executed by the processor:

as for each object appearing in the scene image, generating a unique identifier for the object;

wherein said generating driving assistance information of the vehicle based on the positions of the respective objects comprises: generating the driving assistance information of the vehicle based on positions of the respective objects and their unique identifiers.

22. The driving assistance system according to claim 21, wherein said detecting positions of respective objects appearing in the scene image by using the depth image and the scene image comprises:

extracting features of the respective objects appearing in the scene image by using a convolutional neural network model and based on the depth image and the scene image; and detecting positions of the respective objects appearing in the scene image and generating a unique identifier for each of the respective objects appearing in the scene image by using a Recurrent neural network model and based on the extracted features of the respective objects appearing in the scene image, the lane position information, and positions of the respective objects detected according to at least one frame of depth image acquired previously and at least one frame of scene image acquired previously.

23. The driving assistance system according to claim 21, wherein the computer program codes are further configured to perform the following step when being executed by the processor: as for each object appearing in the scene image, determining a distance between the object and the vehicle; and in a case where the distance between the object and the vehicle is less than a predetermined distance threshold, generating driving assistance information for prompting a driver that the distance between the object and the vehicle is too small.

24. The driving assistance system according to claim 21, wherein when the computer program codes are further configured to perform the following step when being executed by the processor: as for each object appearing in the scene image, determining a distance between the object and the vehicle;

determining a running speed of the vehicle relative to the object;

determining a time at which the vehicle is to collide with the object; and in a case where the determined time is less than a predetermined time threshold, generating driving assistance information for prompting a driver that the vehicle has a risk of colliding with the object.

25. The driving assistance system according to claim 24, wherein said determining a running speed of the vehicle relative to the object comprises:

obtaining a previous position of the object determined according to a previous depth image of the depth image and a previous scene image of the scene image based on the unique identifier of the object; and determining the running speed of the vehicle relative to the object based on a frame rate of the depth camera, the position of the object, and the previous position of the object.

26. The driving assistance system according to claim 19, wherein the computer program codes are further configured to perform the following step when being executed by the processor:

determining a lane occupied by the vehicle according to the lane position information;

in a case where the vehicle occupies only one lane, determining a position of the vehicle in the lane; and in a case where the vehicle occupies more than one lane or the vehicle deviates from a center of the lane being occupied, generating driving assistance information for prompting a driver that the vehicle deviates from the center of the lane.

27. The driving assistance system according to claim 19, wherein the depth camera is a depth camera based on active light.

\* \* \* \* \*